(12) United States Patent
Vandenheste (10) Patent No.: US 10,560,980 B2
(45) Date of Patent: Feb. 11, 2020

(54) METHOD FOR CONTROLLING WIRELESS COMMUNICATION BETWEEN A MOBILE DEVICE AND AN ELECTRONIC DEVICE

(71) Applicant: Brain Base Development Limited, Hong Kong (HK)

(72) Inventor: Antoine Vandenheste, Hong Kong (HK)

(73) Assignee: BRAIN BASE DEVELOPMENT LIMITED, Telegraph Bay (HK)

( * ) Notice: Subject to any disclaimer, the term of this patent is extended or adjusted under 35 U.S.C. 154(b) by 0 days.

(21) Appl. No.: 16/066,164

(22) PCT Filed: Dec. 23, 2016

(86) PCT No.: PCT/CN2016/111716
§ 371 (c)(1),
(2) Date: Jun. 26, 2018

(87) PCT Pub. No.: WO2017/114308
PCT Pub. Date: Jul. 6, 2017

(65) Prior Publication Data
US 2019/0021133 A1 Jan. 17, 2019

(30) Foreign Application Priority Data
Dec. 30, 2015 (HK) ................. 15112868.7

(51) Int. Cl.
*H04W 76/38* (2018.01)
*H04W 4/80* (2018.01)
(Continued)

(52) U.S. Cl.
CPC ......... *H04W 76/38* (2018.02); *H04L 63/0428* (2013.01); *H04M 1/67* (2013.01); *H04W 4/80* (2018.02); *H04W 12/08* (2013.01); *H04W 76/14* (2018.02); *H04W 12/06* (2013.01); *H04W 76/30* (2018.02)

(58) Field of Classification Search
CPC ............. H04L 61/1564; H04L 61/1511; H04L 67/125; H04L 67/34; H04L 41/0803;
(Continued)

(56) References Cited

U.S. PATENT DOCUMENTS

2014/0241354 A1* 8/2014 Shuman ................ H04L 67/16
370/390
2014/0244001 A1* 8/2014 Glickfield ............. H04L 67/16
700/33

(Continued)

FOREIGN PATENT DOCUMENTS

| CN | 102915588 | 2/2013 |
|---|---|---|
| CN | 104219289 | 12/2014 |
| CN | 104902581 | 9/2015 |

*Primary Examiner* — Jung Liu
(74) *Attorney, Agent, or Firm* — Renner Kenner Greive Bobak Taylor & Weber (57) ABSTRACT

A method for controlling wireless communication between a mobile device and an electronic device includes enabling wireless connection between the mobile device and the electronic device via a first wireless communication link; maintaining the wireless connection for a period of time so as to enable communication of information between the mobile device and the electronic device using the first wireless communication link; and terminating the wireless connection between the mobile device and the electronic device in response to a timeout event.

21 Claims, 6 Drawing Sheets

(51) Int. Cl.
*H04W 76/14* (2018.01)
*H04L 29/06* (2006.01)
*H04M 1/67* (2006.01)
*H04W 12/08* (2009.01)
*H04W 76/30* (2018.01)
*H04W 12/06* (2009.01)

(58) Field of Classification Search
CPC . H04L 41/08; H04L 61/3045; H04L 63/0823; H04L 67/025; H04L 61/6004; H04L 63/0281; H04L 63/105; H04L 47/125; H04L 61/305; H04L 63/062; H04L 63/0428; H04L 9/085; H04B 13/005; H04W 4/70; H04W 12/02; H04W 4/50; H04W 12/0023; H04W 12/003; H04W 12/04; H04W 12/06; H04W 4/38; H04W 4/80; G06F 8/60; G06F 16/9566; G06F 21/6263; G06F 21/6245; G06Q 10/10
See application file for complete search history.

(56) References Cited

U.S. PATENT DOCUMENTS

| | | | |
|---|---|---|---|
| 2014/0244710 A1* | 8/2014 | Sharma | H04L 67/12 709/201 |
| 2014/0244833 A1* | 8/2014 | Sharma | H04L 67/16 709/224 |
| 2014/0244834 A1* | 8/2014 | Guedalia | H04L 67/16 709/224 |
| 2015/0019342 A1* | 1/2015 | Gupta | G06Q 10/20 705/14.66 |
| 2016/0044032 A1* | 2/2016 | Kim | H04L 63/0876 726/5 |
| 2016/0087933 A1* | 3/2016 | Johnson | H04W 4/70 709/245 |
| 2016/0149878 A1* | 5/2016 | Pogorelik | H04L 63/062 380/283 |
| 2016/0226732 A1* | 8/2016 | Kim | H04L 12/2807 |
| 2017/0094706 A1* | 3/2017 | Kim | H04W 4/70 |
| 2017/0244715 A1* | 8/2017 | Menon | H04W 12/06 |
| 2017/0347264 A1* | 11/2017 | Holland | H04W 12/06 |

* cited by examiner

METHOD FOR CONTROLLING WIRELESS COMMUNICATION BETWEEN A MOBILE DEVICE AND AN ELECTRONIC DEVICE

TECHNICAL FIELD

The present invention relates to a method for controlling wireless communication between a mobile device and an electronic device and particularly, although not exclusively, to a method for optimizing and automating the connection and disconnection processes for IoT devices.

BACKGROUND

The concept of the Internet of Things (IoT) refers to a world in which every-day between a mobile device and an electronic device and particularly, although not physical objects are embedded with sensors and actuators and are linked to the Internet through wired or wireless networks such that data can be readily gathered, communicated and analysed, and that events can be readily responded to with minimal human intervention. In the era of the Internet of Things (IoT), physical objects can represent themselves digitally in the physical world to interact with other objects, thereby transforming the physical world into a huge information system.

With more and more new types of smart devices, systems, and applications being developed based on the concept of the Internet of Things (IoT), the ability to flexibly control these IoT devices becomes important to users. Prior art solutions have not addressed this need in an optimum manner, resulting in difficulty in using IoT devices for end users. In turn, the inability to easily and flexibly use IoT technologies in many commercial and domestic users has caused the frustration of users in adopting this new technology and increased the learning curve and usability of IoT.

SUMMARY OF THE INVENTION

In accordance with a first aspect of the present invention, there is provided a method for controlling wireless communication between a mobile device and an electronic device, comprising the steps of enabling wireless connection between the mobile device and the electronic device via a first wireless communication link; maintaining the wireless connection for a period of time so as to enable communication of information between the mobile device and the electronic device using the first wireless communication link; and terminating the wireless connection between the mobile device and the electronic device in response to a timeout event.

In one embodiment of the first aspect, the step of enabling wireless connection between the mobile device and the electronic device comprises the steps of: transmitting pairing information from the mobile device to the electronic device via the wireless communication link; and establishing wireless connection between the mobile device and the electronic device based on the pairing information.

In one embodiment of the first aspect, the step of enabling communication of information between the mobile device and the electronic device using the first wireless communication link comprises the step of transmitting a command from the mobile device to the electronic device for controlling operation of the electronic device and/or receiving data at the mobile device from the electronic device.

In one embodiment of the first aspect, the step of terminating the wireless connection between the mobile device and the electronic device is automatic.

In one embodiment of the first aspect, the method further comprises the step of monitoring an operation status associated with the mobile device and/or the electronic device. Preferably, this monitoring step is performed between the step of maintaining the wireless connection and the step of terminating the wireless connection.

In one embodiment of the first aspect, the timeout event is determined by a timer in a timer module arranged in the electronic device or the mobile device.

In one embodiment of the first aspect, the timeout event comprises an elapse of a period of time.

In one embodiment of the first aspect, the period of time is predetermined.

In a preferred embodiment of the first aspect, the period of time is determined dynamically. In particular, the period of time may be determined based on the operation status associated with the mobile device and/or the electronic device.

In one embodiment of the first aspect, the operation status associated with the mobile device and/or the electronic device comprises one or more of: a power level of the mobile device; a power level of the electronic device; an operating state of the mobile device, an operating state of the electronic device, a number of connections between the mobile device and other electronic devices; a number of connections between the electronic devices and other mobile devices; a navigation action on the mobile device; a time or period of connection or disconnection between the mobile device and the electronic device; an application running actively on the mobile device or in a background of the mobile device.

In one embodiment of the first aspect, the navigation action comprises one or more of: locking or unlocking of the mobile device; opening, exiting or terminating an application on the mobile device; and navigating to a different application screen on the mobile device. Preferably, one of the applications on the mobile device comprises a control interface for the electronic device.

In a preferred embodiment of the first aspect, the timer is reset when information is communicated between the mobile device and the electronic device using the first wireless communication link.

In a preferred embodiment of the first aspect, the timer is reset in response to the navigation action on the mobile device.

In a preferred embodiment of the first aspect, the timer is reset when the control interface for the electronic device changes from running actively on the mobile device to running in the background of the mobile device.

In one embodiment of the first aspect, the timeout event comprises terminating the control interface for the electronic device at the mobile device such that the control interface is neither active nor running in the background of the mobile device.

In one embodiment of the first aspect, the method further comprises terminating the wireless connection between the mobile device and the electronic device in response to an interrupt event interrupting the timeout event.

In one embodiment of the first aspect, the interrupt event comprises a remote disconnect request received at the electronic device.

In one embodiment of the first aspect, the remote disconnect request is transmitted from another mobile device to the electronic device via a second communication link. The second communication link may be a wired or wireless connection through Internet or a cloud server. Preferably, the second communication link is encrypted and secured.

In one embodiment of the first aspect, the first wireless communication link is a Bluetooth, ZigBee, NFC, RFID or Wi-Fi communication link. In some embodiments, the first wireless communication link may be a communication link that utilizes the following communication protocols: Z-Wave®, Weave by Google, Inc., and HomeKit by Apple Inc., etc. In one example, the first wireless communication link is a Bluetooth 4.0 communication link. The first wireless communication link is preferably encrypted and secured.

In one embodiment of the first aspect, the electronic device is an IoT device with wireless communication capability. Preferably, the IoT device is a smart device or system integrated with a wireless connection module. Examples of an IoT device include a domestic appliance (e.g., air conditioner), an audio and visual system (e.g., music player, TV, video player), a monitoring and tracking system (e.g., tracker wristband, portable physiological monitor), etc.

In one embodiment of the first aspect, the mobile device is a mobile phone or a tablet computer with wireless communication capability. The mobile device can be any mobile computing device.

In one embodiment of the first aspect, the mobile device is operable to connect simultaneously with one or more other electronic devices via other communication links.

In accordance with a second aspect of the present invention, there is provided a method for controlling wireless communication between a mobile device and a IoT device; comprising the steps of enabling wireless connection between the mobile device and the IoT device via a Bluetooth communication link; maintaining the wireless connection for a period of time so as to enable communication of information between the mobile device and the IoT device using the Bluetooth communication link; monitoring an operation status associated with the mobile device and/or the IoT device so as to determine the period of time; terminating the wireless connection between the mobile device and the IoT device in response to the elapse of the period of time; and terminating the wireless connection between the mobile device and the IoT device in response to an interrupt event interrupting the timeout event. The period of time is determined dynamically based on the operation status associated with the mobile device and/or the IoT device. The operation status includes one or more of: a power level of the mobile device; a power level of the electronic device; an operating state of the mobile device, an operating state of the electronic device, a number of connections between the mobile device and other electronic devices; a number of connections between the electronic devices and other mobile devices; a navigation action on the mobile device; a time or period of connection or disconnection between the mobile device and the electronic device; an application running actively on the mobile device or in a background of the mobile device. The timer is reset: when information is communicated between the mobile device and the electronic device using the first wireless communication link; in response to the navigation action on the mobile device; or when a control interface for the electronic device in a form of an application operable in the mobile device changes from running actively on the mobile device to running in the background of the mobile device. The interrupt event comprises a remote disconnect request received at the electronic device from another mobile device via a cloud server.

In one embodiment of the second aspect, the Bluetooth communication link is a Bluetooth 4.0 (or above) communication link.

In one embodiment of the second aspect, the IoT device is a smart device or system integrated with a wireless connection module. Examples of an IoT device include a domestic appliance (e.g., air conditioner), an audio and visual system (e.g., music player, TV, video player), a monitoring and tracking system (e.g., tracker wristband, portable physiological monitor), etc.

In one embodiment of the second aspect, the mobile device is a mobile phone or a tablet computer with wireless communication capability. The mobile device can be any mobile computing device.

BRIEF DESCRIPTION OF THE DRAWINGS

Embodiments of the present invention will now be described, by way of example, with reference to the accompanying drawings in which.

DETAILED DESCRIPTION OF THE PREFERRED EMBODIMENT

Figure 1:
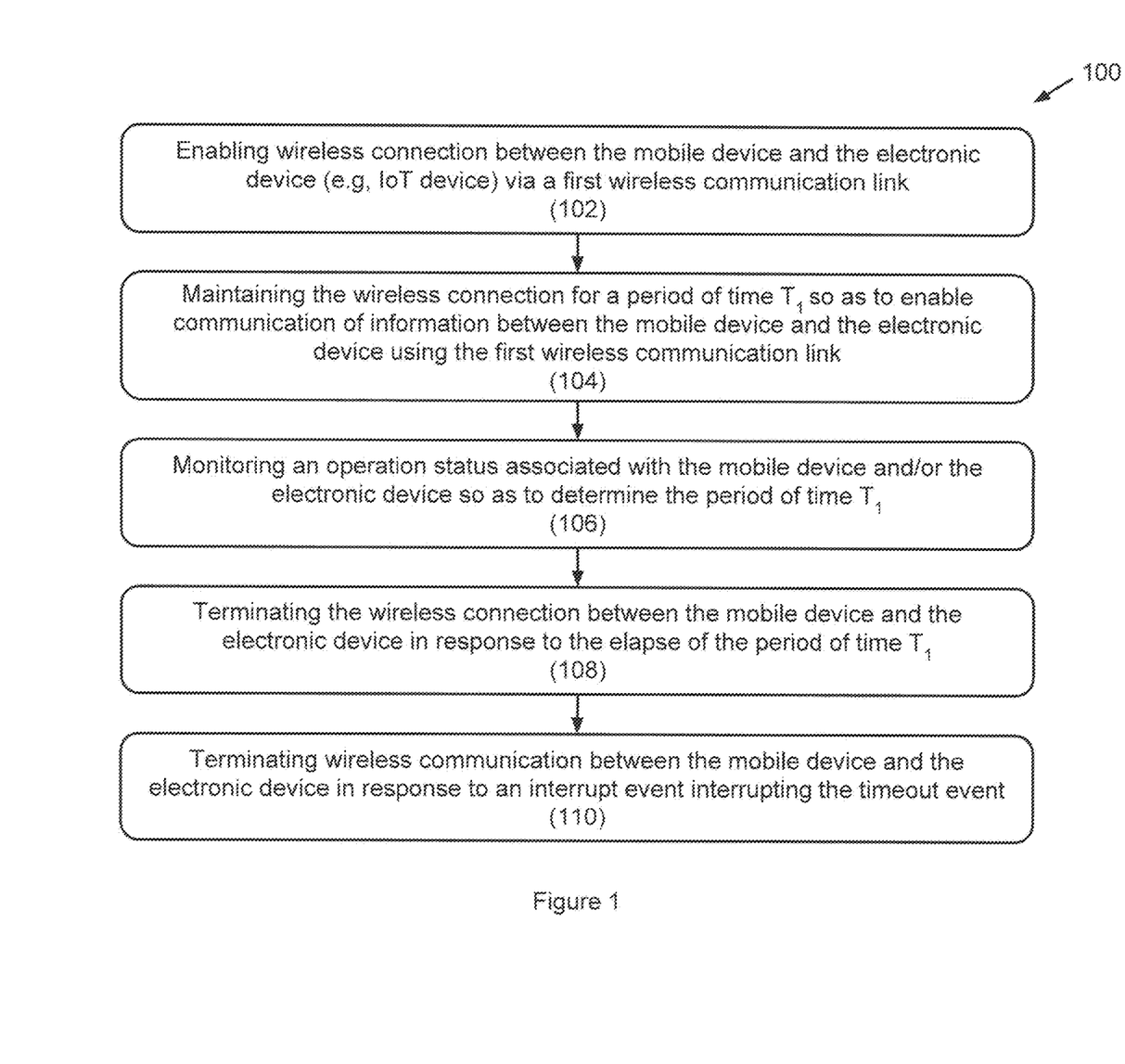
FIG. 1 is a block diagram illustrating a method for controlling wireless communication between a mobile device and an electronic device (e.g., IoT device) in accordance with one embodiment of the present invention.

Referring to FIG. 1, there is provided a method 100 for controlling wireless communication between a mobile device and an electronic device, comprising the steps of enabling wireless connection between the mobile device and the electronic device via a first wireless communication link; maintaining the wireless connection for a period of time so as to enable communication of information between the mobile device and the electronic device using the first wireless communication link; and terminating the wireless connection between the mobile device and the electronic device in response to a timeout event.

As shown in FIG. 1, the method 100 for controlling wireless communication between a mobile device (e.g., mobile phone or tablet computer with wireless communication capability) and an electronic device (e.g., IoT device with wireless communication capability) begins at step 102, in which a wireless connection between the mobile device and the electronic device via a first wireless communication link is established. To establish the wireless connection, pairing information is transmitted from the mobile device to the electronic device via the wireless communication link so that the mobile device and the electronic device are operably associated (i.e., "paired") based on the pairing information. In the present invention, the first wireless communication link may be a Bluetooth, ZigBee, NFC, RFID or Wi-Fi communication link, and is preferably encrypted and secured. In some embodiments, the first wireless communication link may be a communication link that utilizes the following communication protocols: Z-Wave®, Weave by Google, Inc., and HomeKit by Apple Inc., etc. Other similar wireless communication protocol not specifically listed above may also be used. In one example, the first wireless communication link is a Bluetooth 4.0 communication link. Optionally, the mobile device is operable to connect simultaneously with one or more other electronic devices via other communication links.

Upon enabling wireless connection between the mobile device and the electronic device, method 100 proceeds to step 104, in which the wireless connection is maintained for a period of time $T_1$. During this period of time $T_1$, the mobile device and the electronic device remain "paired" with each other, and information can be communicated between the mobile device and the electronic device using the first wireless communication link. In one embodiment, during this period of time $T_1$, commands may be transmitted from the mobile device to the electronic device for controlling operation of the electronic device. In another embodiment, during this period of time $T_1$, data may be transmitted from the electronic device to the mobile device for processing and/or displaying at the mobile device.

In a preferred embodiment, method 100 then proceeds to step 106, in which operation status associated with the mobile device and/or the electronic device is monitored for determining the duration of the period of time $T_1$. The operation status may include one or more of: a power level of the mobile device; a power level of the electronic device; an operating state of the mobile device, an operating state of the electronic device, a number of connections between the mobile device and other electronic devices; a number of connections between the electronic devices and other mobile devices; a navigation action on the mobile device; a time or period of connection or disconnection between the mobile device and the electronic device; an application ("app") running actively on the mobile device or in a background of the mobile device. In one example, the navigation action on the mobile device includes locking or unlocking of the mobile device; opening, exiting or terminating an application on the mobile device; and navigating to a different application screen on the mobile device; etc. Preferably, one of the application ("app") installed in the mobile device is an application ("app") that includes a control interface for the electronic device.

In step 108, the wireless connection between the mobile device and the electronic device is then terminated in response to a timeout event. The timeout event may correspond to a time in which the duration of the period of time $T_1$ has elapsed. Alternatively, the timeout event may correspond to a termination of the control interface for the electronic device at the mobile device, i.e., the control interface ("app") is closed and is neither active nor running in the background of the mobile device. In a preferred embodiment, step 108 is automatic.

In the present invention, the timeout event may be determined by a timer in a timer module arranged in the electronic device or the mobile device. The period of time $T_1$ may be predetermined, e.g., 15 minutes. Alternatively, the period of time $T_1$ may be determined dynamically based on the operation status associated with the mobile device and/or the electronic device (as described in step 106). In the embodiment in which the period of $T_1$ time is determined dynamically, the timer may be reset when information is communicated between the mobile device and the electronic device using the first wireless communication link. Optionally, the timer is also reset in response to the navigation action on the mobile device. The timer may also be reset when the control interface for the electronic device changes from running actively on the mobile device to running in the background of the mobile device. Apparently, resetting the timer would prolong the period of time $T_1$ in which the mobile device and the electronic device remain "paired".

In some embodiments of the present invention, method 100 further includes terminating wireless connection between the mobile device and the electronic device in response to an interrupt event interrupting the timeout event (i.e., the interrupt event occurs before the time of which the timeout event is supposed to occur) in step 110. In step 110, the wireless connection may be terminated before the period of time $T_1$ has elapsed. In one embodiment, the interrupt event includes a remote disconnect request received at the electronic device. The remote disconnect request is preferably transmitted from another mobile device to the electronic device via a second communication link. The second communication link may be a wired or wireless connection through Internet or a cloud server, and is preferably encrypted and secured.

Figure 2:
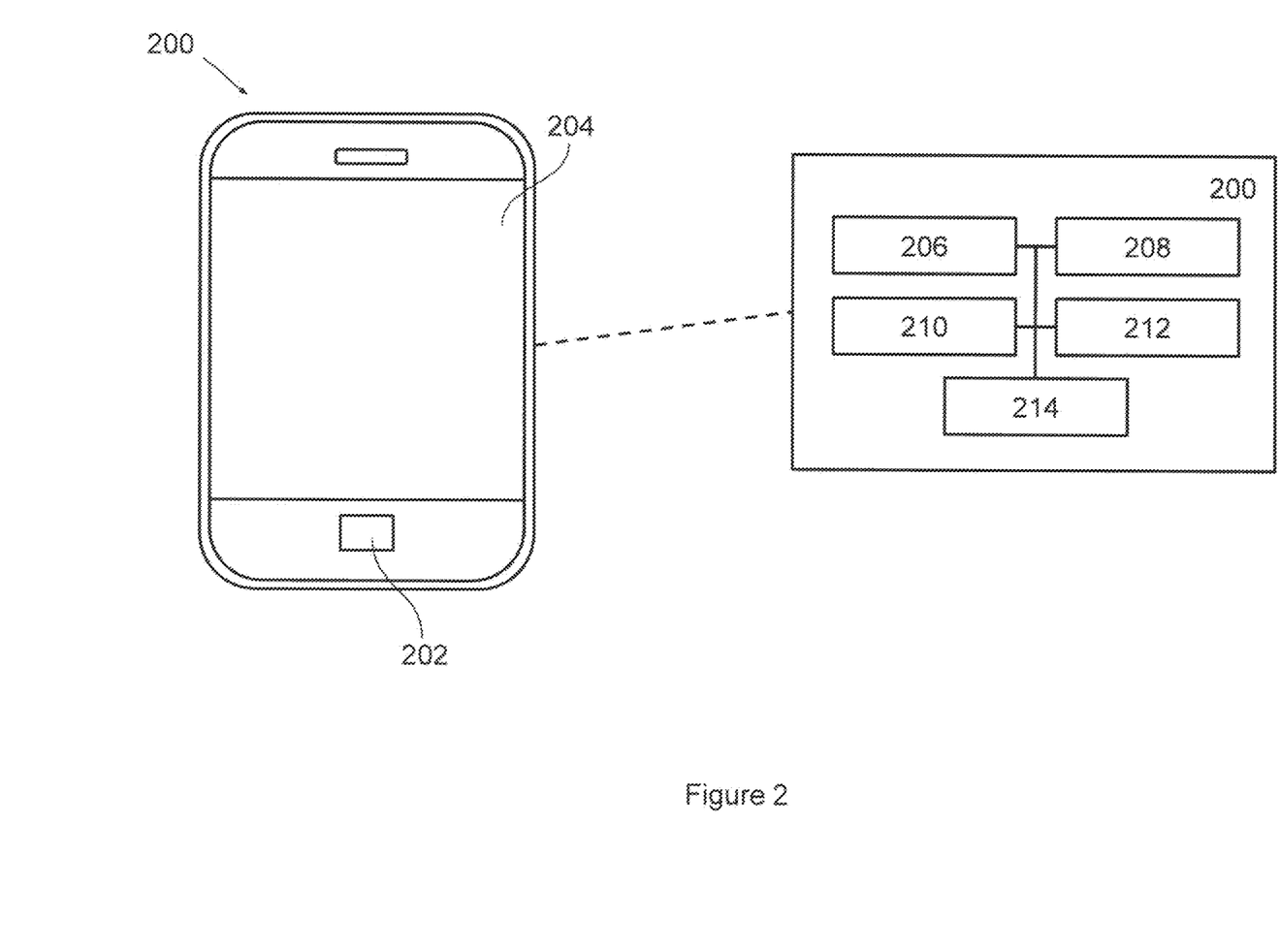
FIG. 2 is a block diagram of a mobile device operable with the method of FIG. 1 in accordance with one embodiment of the present invention.

FIG. 2 shows an exemplary mobile device 200 that is operable with the method of FIG. 1 in accordance with one embodiment of the present invention. As shown in FIG. 2, the mobile device 200 is a mobile phone comprising a button 202 and a touch sensitive screen 204 for receiving user input and for display. The mobile device 200 further includes hardware components necessary to receive, store and execute appropriate computer instructions, code and/or commands. These hardware components may include a processing module (e.g., a MCU, CPU, etc.) 206, a memory module (e.g., RAM, ROM, FLASH, etc.) 208, input/output devices 210 such as an data and power communication ports; the display 204 which may be a liquid crystal display, a light emitting display or any other suitable display that is touch sensitive; and a communication module 212 that are operably connected with each other. The communication module 212 is operable to establish different wired or wireless communications links, and may simultaneously enable connection with one or more other electronic devices/information handling devices such as a server, personal computers, terminals, etc. In one embodiment, the mobile device 200 includes instructions stored in the memory module 208 and can be executed by the processing module 206. The mobile device 200 is preferably installed with an operating system, and with one or more programs, software and/or applications ("apps"). In one embodiment, the mobile device 200 may include a timer module 214 with a timer for determining a timeout event.

It should be noted that other mobile devices (e.g., or tablet computers) having similar functions but different structure and shape can also be used in the method of FIG. 1.

Figure 3:
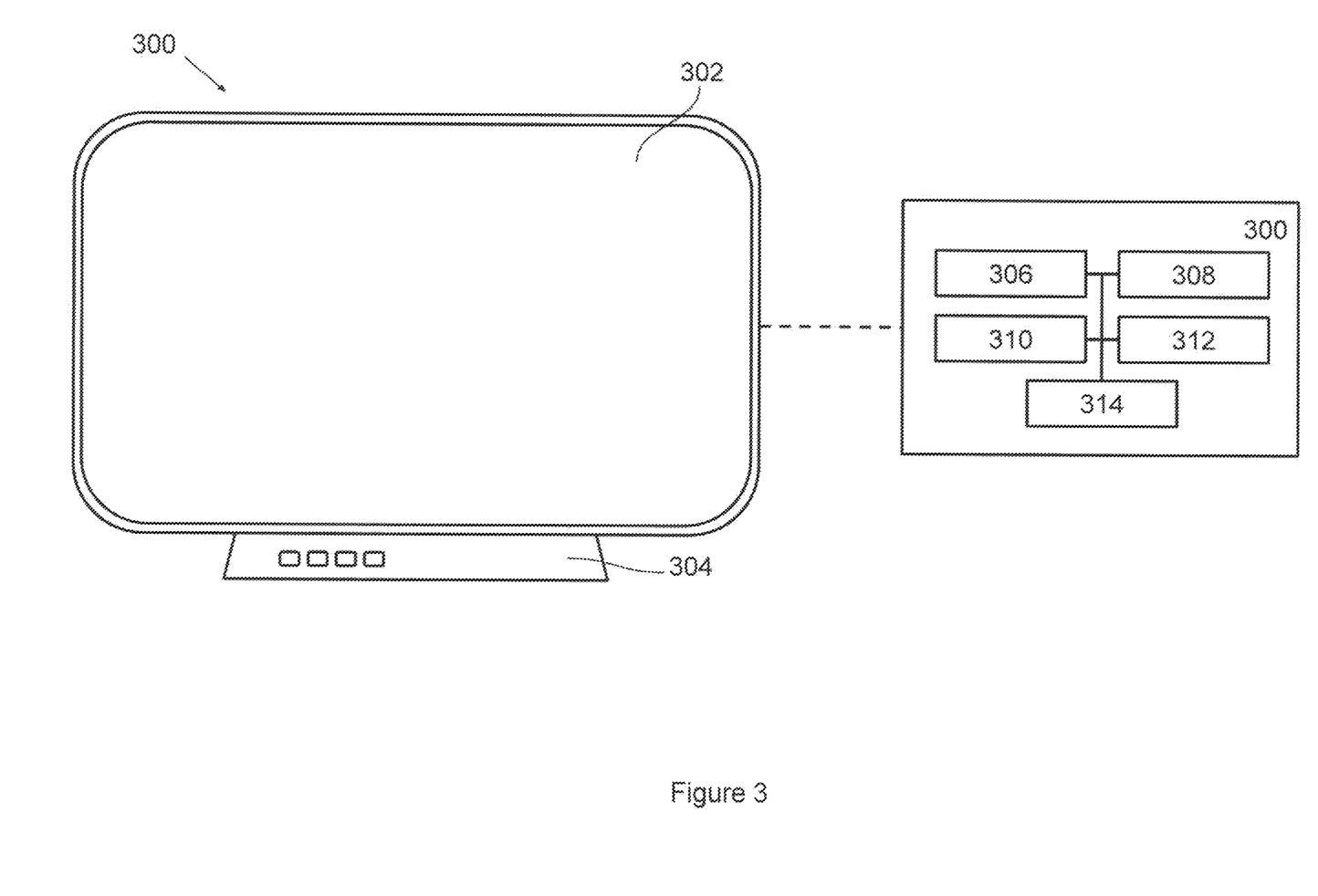
FIG. 3 is a block diagram of an electronic device in the form of a smart TV operable with the method of FIG. 1 in accordance with one embodiment of the present invention.

FIG. 3 shows an electronic device in the form of a smart TV 300 operable with the method of FIG. 1 in accordance with one embodiment of the present invention. As shown in FIG. 3, the smart TV 300 includes a display screen 302 mounted on a base 304. The display screen 302 may be touch-sensitive. The TV 300 may include communication means (e.g., infrared receiver) for receiving a command from a remote controller (e.g., infrared transmitter). The TV 300 further includes hardware components necessary to receive, store and execute appropriate computer instructions, code and/or commands. These hardware components may include a processing module (e.g., a MCU, CPU, etc.) 306, a memory module (e.g., RAM, ROM, FLASH, etc.) 308, an image and signal processing module 310; the display 304 which may be a liquid crystal display, a light emitting display or any other suitable display that is touch sensitive; and a communication module 312 that are operably connected with each other. The communication module 312 is operable to communicate with other mobile devices such as a server, personal computers, terminals, or other electronic devices using wired or wireless communication links. In one embodiment, the smart TV 300 includes instructions stored in the memory module 208 and can be executed by the processing module 306. The smart TV 300 is operable to receive TV contents through a wired or wireless connection for display on the display screen 302. The smart TV 300 may be installed with an operating system, and with one or more programs, software and/or applications ("apps"). In a preferred embodiment, the smart TV 300 may include a timer module 314 with a timer for determining a timeout event.

It should be noted that other electronic devices or IoT having similar functions but different structure and shape can also be used in the method of FIG. 1.

Figure 4:
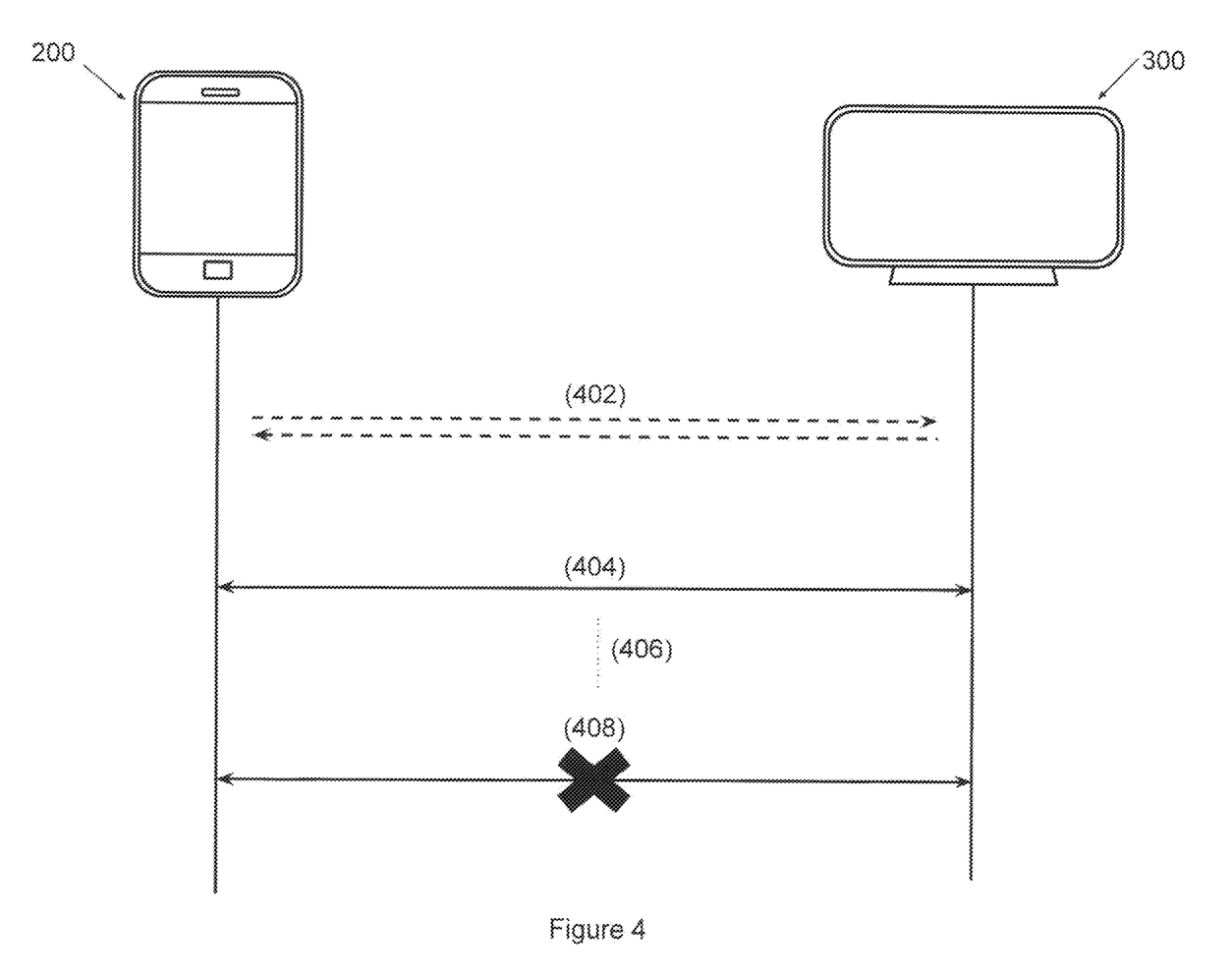
FIG. 4 is an illustration illustrating a basic operation of the method of FIG. 1.

FIG. 4 illustrate the basic operation of the method of FIG. 1 using the mobile device 200 of FIG. 2 and the smart TV 300 of FIG. 3. In step 402, the mobile device 200 uses its communication module 212 to transmit pairing information to the smart TV 300 via a wireless communication link for establishing wireless connection with the smart TV 300. The smart TV 300, upon verifying the pairing information, communicates with the mobile device 200 to establish wireless connection with the mobile device based on the pairing information. In step 404, the mobile device 200 and the smart TV 300 are wirelessly connected with each other; and in step 406, the mobile device 200 and the smart TV 300 remain wirelessly connected for a period of time. During this period of time in step 406, a user may use the mobile device 200 to control the TV 300, for example, by using an "app" with a control interface for the TV 300 installed in the mobile device 200. In one example, the user may switch a channel of the TV 300 by transmitting a command to the TV 300 through the mobile device 200. In another example, the TV 300 may communicate data back to the mobile device 200 to be displayed on the control interface/"app" on the mobile device 200. In step 408, the wireless connection between the mobile device 200 and the smart TV 300 is automatically terminated based on a timeout event.

In one embodiment, the wireless connection between the mobile device 200 and the smart TV 300 may be automatically terminated after a predetermined period of time determined by the timing module 214 of the mobile device 200 or the timing module 314 of the smart TV 300. In an alternative embodiment, the period of time may not be predetermined, but may be determined dynamically based on operation status associated with the mobile device 200 and/or the TV 300. In one example, the period of time may be shortened if the power of the mobile device 200 is low so as to conserve energy in the device 200. In another example, the period of time may be shortened if the mobile device 200 enters a locked state (reduced operation state).

In one embodiment, the timer in the timing module 214 of the mobile device 200 or the timing module 314 of the smart TV 300 may be reset when the information is communicated between the device 200 and the TV 300. This may prolong the period of time before termination of the connection between the device 200 and the TV 300. In another embodiment, the timer in the timing module 214 of the mobile device 200 or the timing module 314 of the smart TV 300 may be reset when the user switches the control interface for controlling the TV with another control interface for controlling another IoT device, i.e., when the control interface for the TV 300 changes from running actively on the mobile device 200 to running in the background of the mobile device 200.

Figure 5:
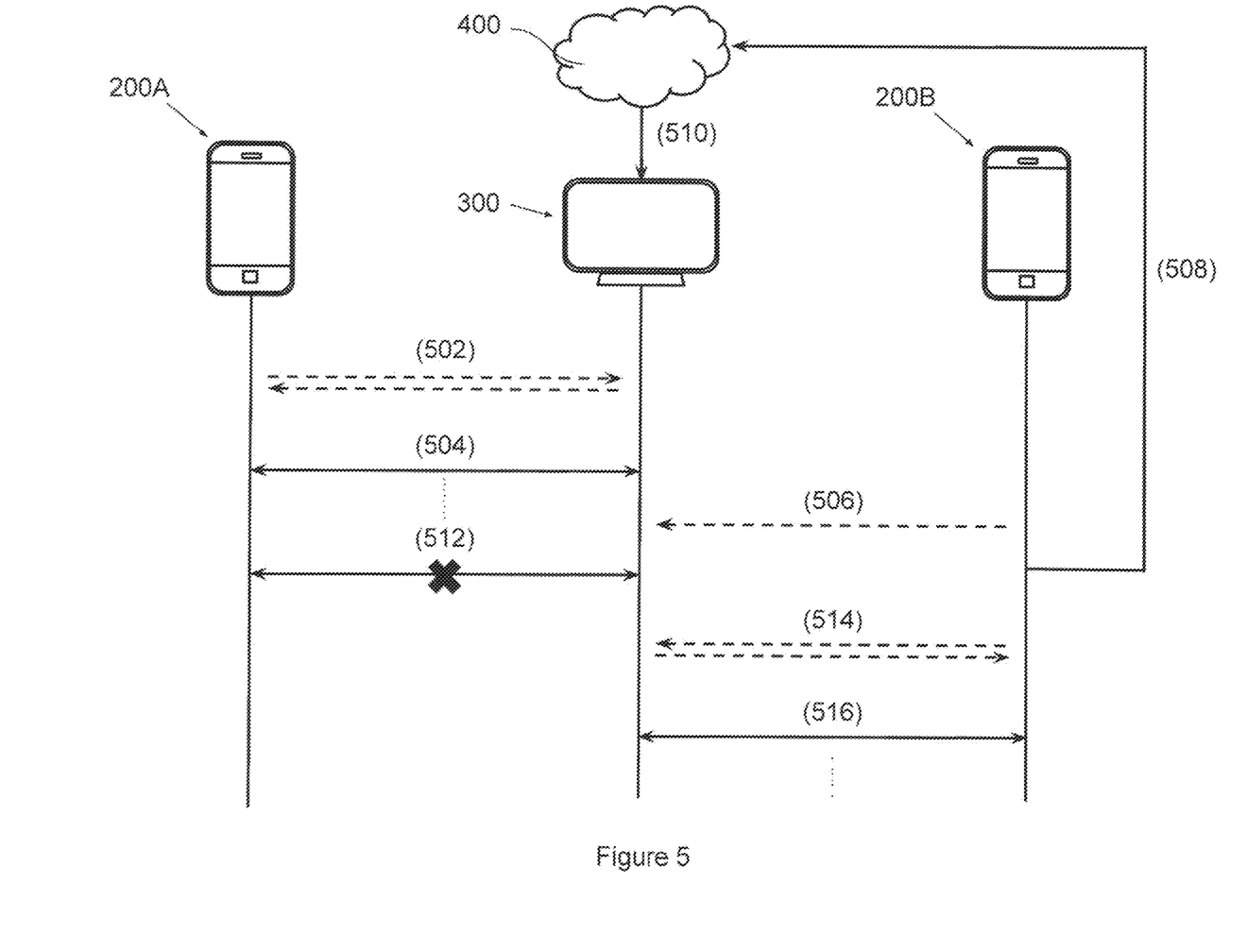
FIG. 5 is an illustration illustrating an operation of an interrupt event in the method of FIG. 1.

FIG. 5 is an illustration illustrating an operation of an interrupt event in the method of FIG. 1. As shown in FIG. 5, the system includes two mobile devices 200A, 200B, and a smart TV 300. Preferably, the structure of mobile devices 200A, 200B are the same as the mobile device 200 described with respect to FIGS. 2 and 4.

In step 502, the mobile device 200A attempts to establish wireless connection with the TV 300, similar to step 402 in FIG. 4. Then in step 504, wireless connection between the device 200A and the TV 300 is established, like step 404 in FIG. 4. In step 506, before the period of time elapses, i.e., before the wireless connection between the device 200A and the TV 300 is terminated, another mobile device 200B attempts to connect with TV 300. However, as the TV 300 can only be "paired" with one mobile device at a time, and it has already "paired" with mobile device 200A, mobile device 200B cannot be "paired" with the TV 300. Upon failing to wirelessly connect with the TV 300, a user of the mobile device 200B attempts to take over control of the TV 300 from mobile device 200A. Accordingly, in steps 508 and 510, the user of the mobile device 200B transmits a remote disconnect request to a cloud server 400 and hence the TV 300. The TV 300, upon receiving the remote disconnect request, verifies whether the device 200A is actively communicating with the TV 300. If device 200A is determined to be not actively communicating with the TV 300, in step 512, the wireless communication between the device 200A and the TV 300 is interrupted and terminated, before the elapse of the period of time. Then, in step 514, the mobile device 200B attempts to establish wireless connection with the TV 300, similar to step 402 in FIG. 4. In step 516, wireless connection between the device 200A and the TV 300 is established, similar to step 404 of FIG. 4. If no interrupt event occurs after step 516, the wireless connection between the device 200B and the TV 300 will be automatically terminated after a period of time in response to a timeout event.

Figure 6:
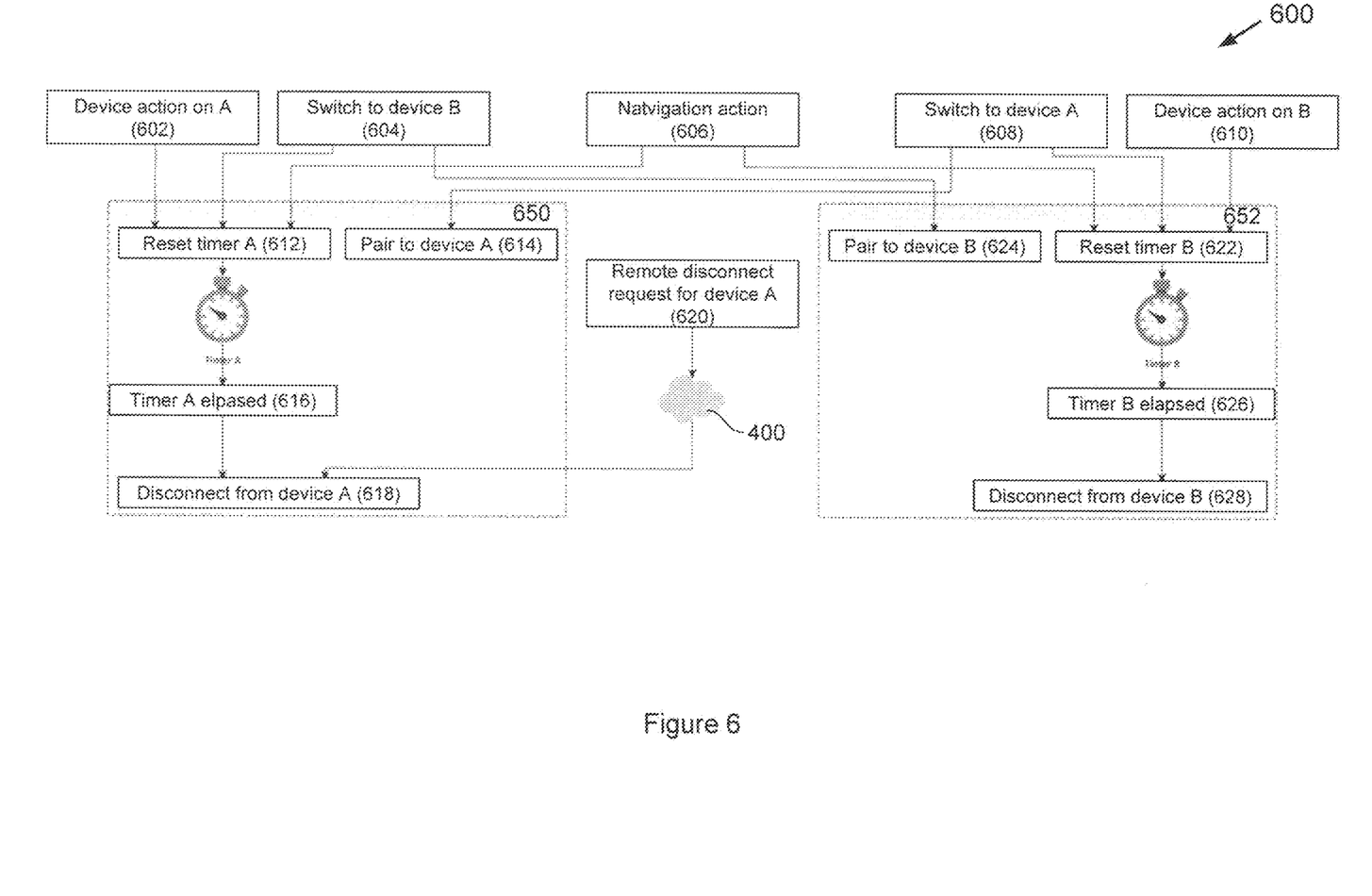
FIG. 6 is a block diagram illustrating the timer operation of the method of FIG. 1 in an environment with two mobile devices and two electronic devices.

FIG. 6 is a block diagram illustrating the timer operation of the method of FIG. 1 in a system 600 with two managers 650, 652 for managing two electronic devices. The managers 650, 652 are arranged to determine when to connect or disconnect with the electronic devices based on a set of rules. The mobile device may be the devices illustrated in FIG. 2, and the electronic devices may be any IoT devices such that that illustrated in FIG. 3. As shown in FIG. 6, the manager 650 for managing an electronic device A and the manager 652 for managing an electronic device B each includes a timer. The duration of the timers of the two managers 650, 652 may be different.

In the embodiment of FIG. 6, every time the user operates the electronic device from the mobile device ("device action"), the timer of the electronic device is reset, prolonging the time of which the electronic device and the mobile device remain "paired". In particular, in blocks 602 and 610, a device action on electronic device A will reset the timer of device A and a device action on electronic device B will reset the timer of device B.

On the other hand, when the user "switches devices", for example, switches the control interface for controlling device A to the control interface for controlling device B on the mobile device as in block 604, the mobile device will be "paired" with device B, and the timer of device A will be reset. In this case, the mobile device preferably remain connected with both devices A and B, with the control interface for controlling device A running in the background of the mobile device and the control interface for controlling device B running actively on the mobile device. Alternatively, when the user switches the control interface for controlling device B to the control interface for controlling device A on the mobile device as in block 608, the mobile device will be "paired" with device A, and the timer of device B will be reset. In this case, the mobile device preferably remain connected with both devices A and B, with the control interface for controlling device B running in the background of the mobile device and the control interface for controlling device A running actively on the mobile device.

In block 606, if a user of the mobile device performs a navigation action, for example, switches to use other apps other than the control interfaces for controlling devices A and B, the timers of devices A and B, if paired with the mobile device, will be reset. This prolongs the time of which the electronic device and the mobile device remain "paired", in case the user want to return to the control interfaces for controlling the devices A and B. In some embodiments, the wireless connection between the mobile device and the electronic devices A and B may be terminated upon termination of the control interfaces for controlling devices A and B (e.g., quitting and closing the "app" of the control interface such that the control interface is no longer active and running in the background).

In block 620, when a user needs to connect with electronic device A but cannot because another user (another mobile device) is "paired" with it, a remote disconnect request can be transmitted to device A through a cloud server so as to interrupt and terminate the wireless connection, even before the timer elapses.

In the present embodiment, if the user of the mobile device does not return in time to reset the timer, the wireless connection between the mobile device and the electronic devices A and/or B will be terminated.

The embodiments of the method in the present invention are particularly advantageous as it allows a user of a mobile device to seamlessly connect with and control different IoT devices simultaneously. Also, the method in the present invention allows a different user to take over control of an IoT device from another mobile device initially connected with the IoT device, preventing a lock-out situation in which a user of the other mobile device cannot connect with the IoT device because it was not the first device to connect with the IoT device and even if the initial connection is idle or not used. Sharing of the connection with and control of IoT device is thus achieved.

By terminating a connection between the mobile device and the IoT device based on a timeout event, the present invention also substantially avoids unnecessary depletion of battery of both the mobile device and the IoT devices for maintaining the connection therebetween. In the present invention, the automatic termination of idle connections can free-up connections that are not in use, promoting better resource utilization. This is particularly important in view of the fact that the number of connections a mobile device can have with other electronic devices is limited. Other advantages of the present invention will become apparent to a person skilled in the art upon reading the description and the appended drawings.

Although not required, the embodiments described with reference to the Figures can be implemented as an application programming interface (API) or as a series of libraries for use by a developer or can be included within another software application, such as a terminal or personal computer operating system or a portable computing device operating system. Generally, as program modules include routines, programs, objects, components and data files assisting in the performance of particular functions, the skilled person will understand that the functionality of the software application may be distributed across a number of routines, objects or components to achieve the same functionality desired herein.

It will also be appreciated that where the methods and systems of the present invention are either wholly implemented by computing system or partly implemented by computing systems then any appropriate computing system architecture may be utilised. This will include stand-alone computers, network computers and dedicated hardware devices. Where the terms "computing system" and "computing device" are used, these terms are intended to cover any appropriate arrangement of computer hardware capable of implementing the function described.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A method for controlling wireless communication between a mobile device and an electronic device, comprising the steps of:
   enabling wireless connection between the mobile device and the electronic device via a first wireless communication link;
   maintaining the wireless connection for a period of time so as to enable communication of information between the mobile device and the electronic device using the first wireless communication link;
   monitoring an operation status associated with the mobile device and/or the electronic device, the operation status includes a navigation action on the mobile device; and
   terminating the wireless connection between the mobile device and the electronic device in response to a timeout event, the timeout event comprising an elapse of a period of time determined based on the operation status;
   wherein the timeout event is determined by a timer in a timer module arranged in the electronic device or the mobile device, and the timer is reset in response to the navigation action on the mobile device.

2. The method in accordance with claim 1, wherein said step of enabling wireless connection comprises the steps of:
   transmitting pairing information from the mobile device to the electronic device via the wireless communication link; and
   establishing wireless connection between the mobile device and the electronic device based on the pairing information.

3. The method in accordance with claim 1, wherein said step of maintaining the wireless connection comprises the step of:
   transmitting a command from the mobile device to the electronic device for controlling operation of the electronic device.

4. The method in accordance with claim 1, wherein said step of maintaining the wireless connection comprises the step of:

receiving data at the mobile device from the electronic device.

5. The method in accordance with claim 1, wherein said step of terminating the wireless connection is automatic.

6. The method in accordance with claim 1, wherein the timer is reset when information is communicated between the mobile device and the electronic device using the first wireless communication link.

7. The method in accordance with claim 1, wherein the operation status associated with the mobile device and/or the electronic device further comprises one or more of:
- a power level of the mobile device;
- a power level of the electronic device;
- an operating state of the mobile device;
- an operating state of the electronic device;
- a number of connections between the mobile device and other electronic devices;
- a number of connections between the electronic devices and other mobile devices;
- a time or period of connection or disconnection between the mobile device and the electronic device; and
- an application running actively on the mobile device or in a background of the mobile device.

8. The method in accordance with claim 1, wherein the navigation action comprises one or more of:
- locking or unlocking of the mobile device;
- opening, exiting or terminating an application on the mobile device; and
- navigating to a different application screen on the mobile device.

9. The method in accordance with claim 8, wherein the timer is reset when the control interface for the electronic device changes from running actively on the mobile device to running in the background of the mobile device.

10. The method in accordance with claim 7, wherein the application comprises a control interface for the electronic device.

11. The method in accordance with claim 7, wherein the timeout event comprises terminating the control interface for the electronic device at the mobile device such that the control interface is neither active nor running in the background of the mobile device.

12. The method in accordance with claim 1, further comprising:
e) terminating wireless connection between the mobile device and the electronic device in response to an interrupt event interrupting the timeout event.

13. The method in accordance with claim 12, wherein the interrupt event comprises a remote disconnect request received at the electronic device.

14. The method in accordance with claim 13, wherein the remote disconnect request is transmitted from another mobile device to the electronic device via a second communication link.

15. The method in accordance with claim 14, wherein the second communication link is a wired or wireless connection through Internet or a cloud server.

16. The method in accordance with claim 14, wherein the second communication link is encrypted and secured.

17. The method in accordance with claim 1, wherein the first wireless communication link is a Bluetooth, ZigBee, NFC, RFID or Wi-Fi communication link.

18. The method in accordance with claim 17, wherein the first wireless communication link is encrypted and secured.

19. The method in accordance with claim 1, wherein the electronic device is an IoT device with wireless communication capability.

20. The method in accordance with claim 1, wherein the mobile device is a mobile phone or a tablet computer with wireless communication capability.

21. The method in accordance with claim 1, wherein the mobile device is operable to connect simultaneously with one or more other electronic devices via other communication links.

* * * * *